March 16, 1954  R. C. MATHES  2,672,512
SYSTEM FOR ANALYZING AND SYNTHESIZING SPEECH
Filed Feb. 2, 1949  5 Sheets-Sheet 3
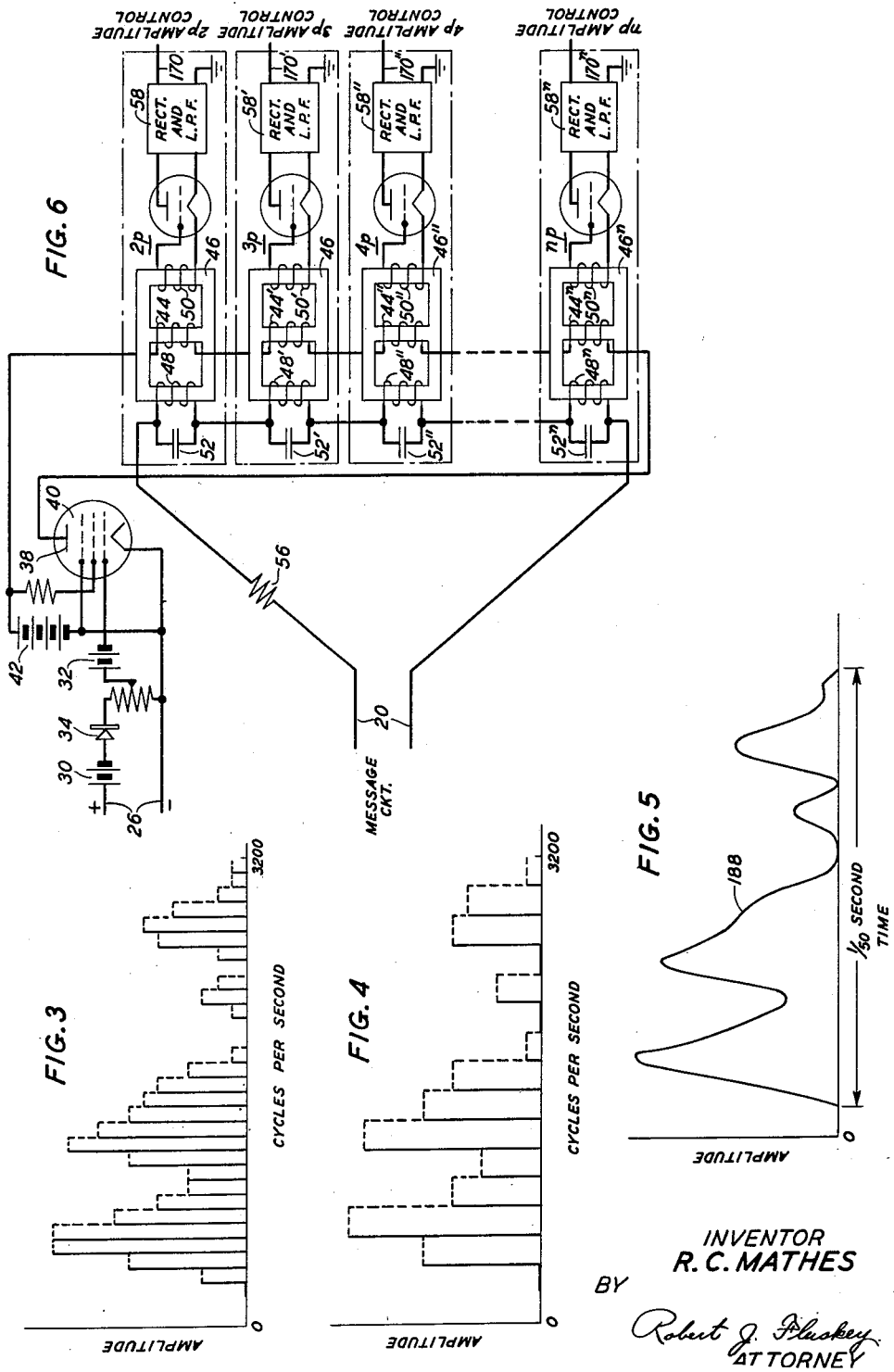
INVENTOR
R. C. MATHES
BY
Robert J. Plaskey
ATTORNEY

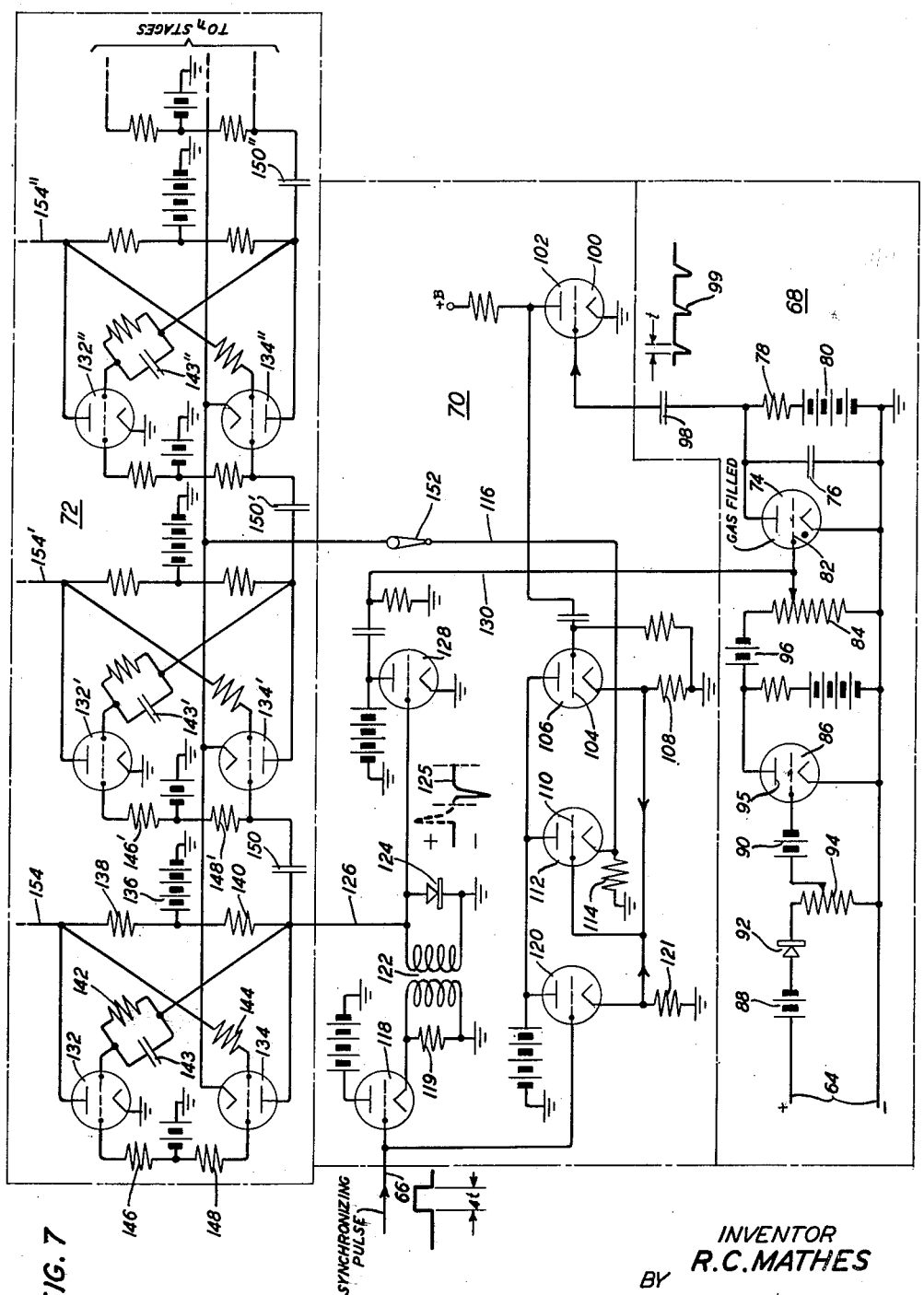

*INVENTOR*
*R. C. MATHES*

Patented Mar. 16, 1954

2,672,512

UNITED STATES PATENT OFFICE 2,672,512

SYSTEM FOR ANALYZING AND
SYNTHESIZING SPEECH

Robert C. Mathes, Maplewood, N. J., assignor to Bell Telephone Laboratories, Incorporated, New York, N. Y., a corporation of New York Application February 2, 1949, Serial No. 74,064

21 Claims. (Cl. 179—1.5)

The present invention relates to signal wave transmission systems, and more particularly to such systems wherein a complex wave is analyzed to determine its fundamental characteristics.

The invention is particularly adapted to providing an improved type of harmonic analysis of a complex wave whose fundamental frequency is varying. It is concerned with securing accurate information concerning the amplitude-frequency characteristic of signal waves, which information may then be used in lieu of the original signal frequencies for the transmission of the message intelligence.

Although the invention is particularly applicable to the transmission of speech signal waves, its utility is not limited to such signal waves, since it may be used with equal facility to transmit the intelligence of any signal wave of a periodic or quasi-periodic type.

In a specific embodiment of the invention, which will be described hereinafter, the invention is shown as being incorporated in a vocoder transmission system such, for example, as was disclosed in H. W. Dudley Patent 2,151,091, March 21, 1939. The present invention is in the nature of an improvement on certain aspects of such a system.

In the vocoder message transmission system, for example, the system that is disclosed in the previously mentioned Dudley patent, the message waves are divided into two portions and these portions are then analyzed to determine certain of their fundamental characteristics. One of these portions is subjected to a process by which the original fundamental frequency of the signal wave is determined. The product of this frequency determining process may be a unidirectional voltage the magnitude of which slowly varies at a rate corresponding to the syllabic rate of the message signal. This voltage may be transmitted directly to the receiving station for use in the signal reproduction process, or it may be used to control the magnitude of a single frequency alternating voltage which may, in turn, be transmitted to the receiving station for use in the reproduction process, as is explained in the Dudley patent.

The second portion of the divided signal wave is further divided into a fixed number of frequency sub-bands. Each of these narrow frequency bands is then subjected to a detection process in which the signal energy falling within that band is integrated. This process produces a number of slowly varying currents, or voltages, the magnitude of each being representative of the signal energy in a corresponding frequency sub-band at any given instant. These slowly varying currents, which collectively form the so-called amplitude pattern control current, are also transmitted, either in their derived state, or as modulated distinctive frequency voltages, to the receiving station where they control the amplitude-frequency distribution of the reproduced signal wave.

At the receiving point, these signal-defining currents, or voltages, are utilized to (a) control the fundamental frequency of a source of so-called "voiced" energy, and (b) control the amplitude distribution of the synthesized signal energy within the frequency band of the reproduced signal. For a more complete understanding of the operation of this vocoder system, reference may be had to the previously mentioned Dudley patent.

In signal transmission systems of the type which has just been generally described, the original signal energy is subdivided into narrow frequency bands through the use of a number of fixed frequency band filters. Because the pass-band of each of these filters is a fixed quantity, and because the location of the prominent harmonic components of the signal waves is not a fixed quantity, it frequently happens that an important harmonic component of the signal frequency will occur at or near a frequency which corresponds to the cross-over point on the attenuation curves of two adjacent band filters. Since these cross-over points occur at the edges of the pass-bands of the filters at points where the attenuation characteristics of the filters are changing relatively rapidly, the coinciding harmonic frequencies are unduly attenuated, and are also subjected to phase variations which are not proportional to frequency. This means that, as the pitch of the signal varies, one or more of the harmonic components of the wave may have undesirable amplitude and phase modulations superposed upon it, which modulations are reproduced in the synthesized signal. This effect may occur at each cross-over point within the signal frequency band, and hence has been called the "comb" effect.

A second undesirable effect that may arise because of the fixed character of the pass-bands of the segregating band filters occurs in the synthesizing operation at the receiving end of the system. At the receiving end a source which is rich in harmonic components, and in which adjacent components are of substantially the same magnitude, supplies the energy for the synthesized "voice" signal. The receiving end band filters transmit all harmonic frequencies which fall within their pass-band with about equal facility. The amplitudes of these passed harmonics are then modulated in accordance with their respective signal-defining control currents in such manner that all harmonics within an individual pass-band have substantially the same amplitude, which amplitude is the integrated value of all of the harmonics in the corresponding band of the signal. This condition produces a synthesized signal which is made up of a number of frequency components in substantially harmonic distribution, and in which the amplitudes of the harmonic frequencies within a group are substantially equal, instead of a signal in which each harmonic component has the same relative amplitude as it had in the original signal. This relationship has been characterized as the "block" effect, and is believed to impart a raucous quality to the synthesized signal.

It is accordingly an object of this invention to improve the amplitude-frequency analysis of complex waves, which waves may include a number of harmonically related frequency components.

It is also an object of this invention to determine the amplitude-frequency characteristic of the harmonic components of a complex wave without introducing undesirable amplitude or phase changes during the analysis.

It is also an object of this invention to analyze a complex wave in accordance with the number of harmonic components that are present in the wave at any given instant. As the number of harmonic components varies from one instant to another, it is an object of this invention to vary accordingly the number of amplitude-frequency relationships that are determined.

It is also an object of this invention to improve the quality of the synthesized signal of a vocoder transmission system by reconstructing the signal from harmonically related frequency components which are at all times equal in number to and in substantially the same order of amplitudes as corresponding harmonically related frequency components in the original signal wave.

It is a feature of the present invention that segregating means are utilized in the analysis of a complex signal wave whereby the individual harmonic components of the wave are separately segregated by an individual means notwithstanding that each component varies its position in the frequency spectrum from instant to instant.

It is also a feature of this invention that a variable number of variable frequency segregating means are utilized at the synthesizing point to select from the source of synthesizing energy an equal number of harmonically related frequency components as those existing in the original wave.

It is a further feature of the invention that although the number of harmonically related frequency components that are analyzed is a variable quantity, and although the number of harmonically related frequency components that are selected at the synthesizing station is variable from instant to instant, the number of and band width of the transmission channels interconnecting the analyzing and synthesizing stations remain fixed.

The invention is further featured by a specimen-taking, or sampling process, in which the variable number of segregated signal components are sampled at a cyclical recurrence rate that is proportional to the maximum number of amplitude changes in the signal, while at the same time the interval between samples of adjacent components is varied in accordance with changes in the pitch of the original signal.

Other desirable objects and features of the invention, and the manner in which they are realized, will be apparent from the following detailed description of one embodiment of the invention, when considered in connection with the drawings, in which:

Figs. 3, 4, 5, 8A and 8B are illustrative graphs to which reference is made in the detailed description of the invention;

Fig. 6 is a diagram of the variable frequency segregating means employed at the transmitting end of the system comprised in Figs. 1 and 2;

Fig. 7 is a schematic diagram of the variable speed enabling circuit of the invention;

Figure 1:
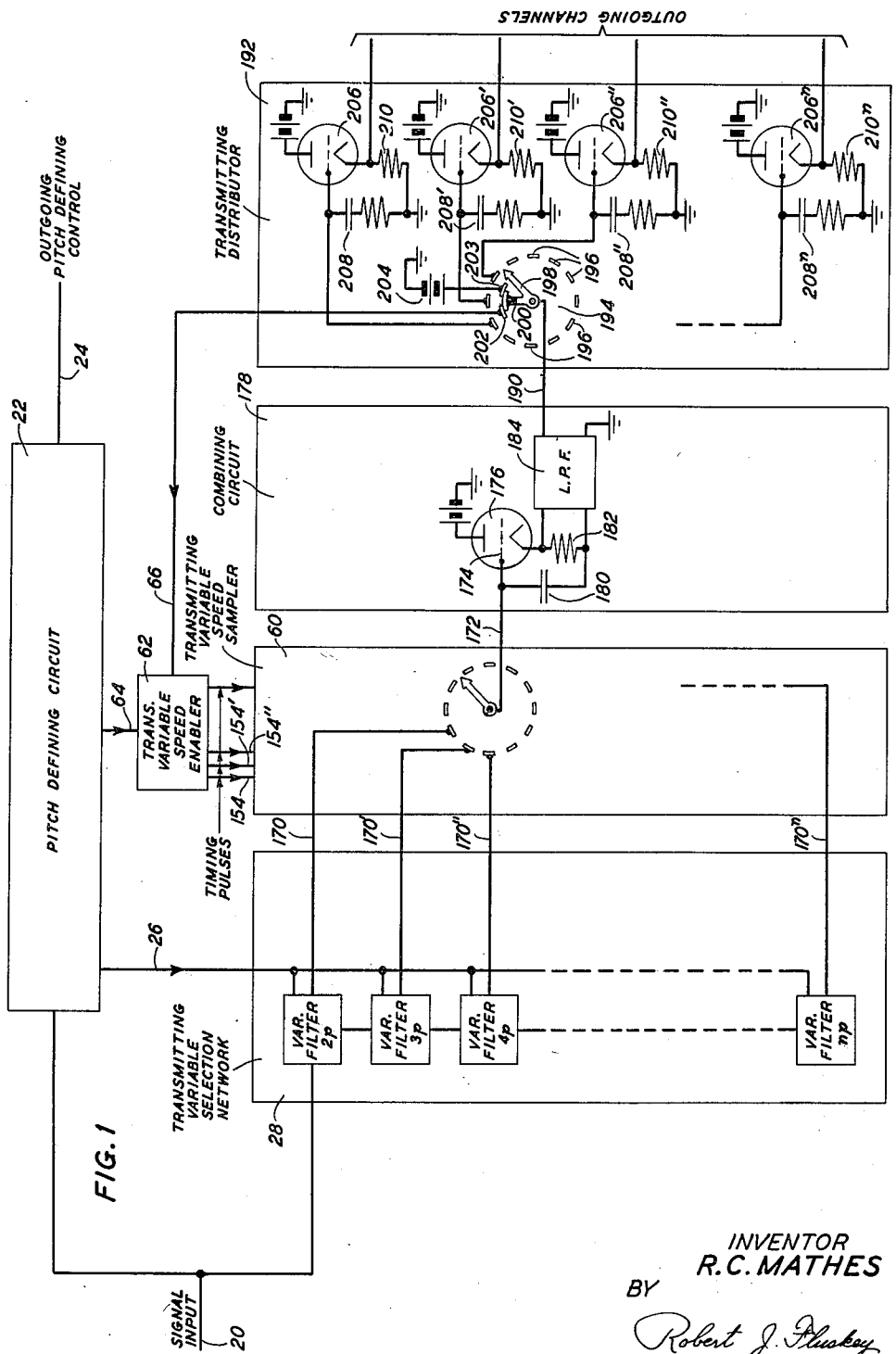
Fig. 1 shows a block schematic diagram of the analyzing end of a vocoder transmission system, the amplitude-frequency analyzing branch of which has been arranged in accordance with the invention.

In accordance with this invention, the message signal wave is subdivided into two portions for fundamental pitch and amplitude-frequency determining purposes. The pitch-defining portion is utilized to derive a unidirectional voltage the amplitude of which varies at a slow syllabic rate, and which is indicative of the instantaneous fundamental frequency of the message signal. This unidirectional voltage serves three purposes. One is the control of the fundamental frequency of the receiving end source of synthetic "voiced" energy. Another is the control of the frequency setting of a plurality of variable frequency segregating means. The third is the control of the speed, or frequency of recurrence, with which samples are taken of the energy selected from the signal wave by each of these variable frequency segregating means at the analyzing end and the sampling of a spectrum-amplitude voltage at the receiving end of the system. The specific manner in which these control purposes are effected will be later described in considerable detail.

The second portion of the original signal wave is analyzed in the amplitude-frequency control branch of the system. This branch includes a variable frequency segregating circuit for selecting each individual harmonically related frequency component that may be present in the signal wave. Each segregating means included in this circuit has a variable frequency characteristic which is controlled by the pitch-defining unidirectional voltage referred to previously.

These selected energies, corresponding to the several harmonic components in the signal wave, are directed into individual circuit channels where they are stored. Specimens of these energies are recurrently taken by a sampling, or gating, arrangement which is also under the control of the previously mentioned pitch-defining voltage. This sampling circuit is so controlled that it performs a complete sampling cycle during a fixed interval that is proportional to the maximum number of signal changes in a second, but it varies its sampling rate during any cycle in a manner that is inversely proportional to the pitch of the signal at the corresponding time. Therefore, during any interval of time, the number of samples taken is inversely proportional to the fundamental frequency of the signal wave during that interval. Stated otherwise, the number of samples is equal to the number of harmonic components that are present in the signal frequency band. These individual samples are combined into a composite voltage function that portrays an amplitude-frequency time representation of the envelope of the original signal energy. This composite representation may be termed a spectrum-amplitude voltage which is representative of the relative amplitudes of the harmonic frequency components that are present in the signal wave during any interval.

At the synthesizing station or terminal of the system this spectrum amplitude-defining voltage is sampled by a variable speed sampling, or gating arrangement, the sampling frequency of which is under the control of the pitch-defining voltage in the same manner as is the speed of the sampler at the analyzing station or terminal of the system. This insures that the spectrum-amplitude curve, or voltage, shall be sampled the same number of times and in the same relative time order as the energy samples occurred at the analyzing point in constructing this spectrum voltage. Variable frequency segregating means, corresponding in number and frequency characteristics to the variable frequency segregating means at the analyzing terminal are controlled in their operation by the pitch-defining voltage such that they select from the source of synthetic "voiced" signal energy, frequency components which have the same relative frequency spectrum positions as did the harmonically related frequency components in the original signal wave. The output of each variable segregating means is supplied to a shaping network along with an amplitude control voltage that is obtained from the spectrum-amplitude voltage representation. In this manner, the reproduced, or synthesized, signal is composed of an equal number of harmonically related frequency components of the same fundamental frequency as existed in the original signal wave at any given instant. Furthermore, these components are maintained at substantially the same relative amplitudes as they possessed in the original signal wave.

Because the variable frequency segregating means are so controlled that they follow at the analyzing terminal the individual harmonic components, the frequency position of the harmonic components never coincides with the cross-over frequency of two adjacent segregating means. Therefore, the objectionable amplitude and phase modulations which sometimes exist in the fixed band selecting system are avoided.

At the receiving, or synthesizing terminal, the previously mentioned block effect is greatly reduced, or is eliminated since the synthesized signal is composed of harmonically related components that are numerically equal and substantially similar in their relative amplitudes to the components in the original signal wave. These relationships result in the reconstruction of a synthesized signal the envelope of which closely resembles that of the original signal wave, and which contains a greatly reduced number of discontinuities. This characteristic might be otherwise stated to be that the envelope of the synthesized signal varies more smoothly from one to another of its values than is usual in the previously described fixed-band system.

Figure 2:
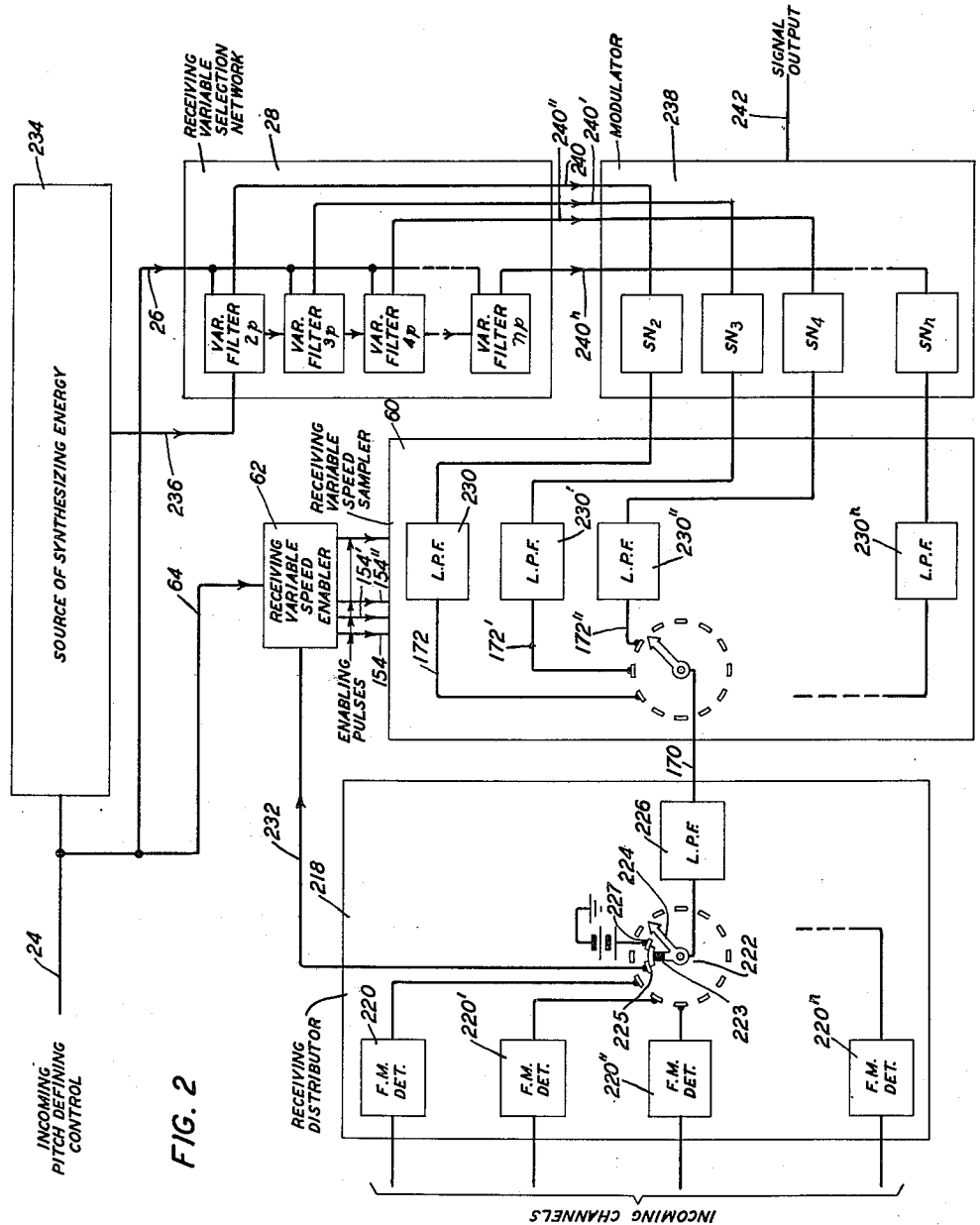
Fig. 2 is a block schematic diagram of the receiving, or synthesizing, end of a vocoder transmission system in which the receiving amplitude-frequency control branch of the system is arranged in accordance with the invention.
Figure 9:
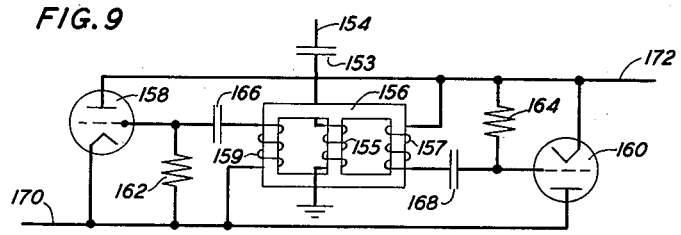
Fig. 9 is a schematic diagram of a variable speed sampling, or gate circuit which may be utilized in connection with the invention.

An apparatus for suitably performing the previously described analyzing and synthesizing functions is indicated in block schematic form in Figs. 1 and 2, when arranged with Fig. 1 to the left. The details of various of the circuit arrangements that are utilized in the spectrum-amplitude branch of this system are illustrated in Figs. 6, 7 and 9 to which reference will be made in the following description.

No specific circuit details are shown for pitch-defining circuit 22, since the circuit arrangement that would be employed for this unit would be governed by the type, or characteristics, of the signal wave that is to be analyzed. For the successful practice of this invention, it will be satisfactory if the pitch-defining circuit 22 produces a slowly fluctuating unidirectional voltage, the amplitude of which is at all times substantially linearly related to the fundamental frequency of the signal wave. Such a circuit arrangement is disclosed in Fig. 2 of the above-mentioned Dudley Patent 2,151,091, March 21, 1939.

Transmitting and receiving variable selection networks 28 are substantially identical. Their details are shown in Fig. 6, in which bias batteries 30, 32, rectifier 34 and potentiometer 36 cooperate with a unidirectional pitch-defining voltage from circuit 22 obtained over connection circuit 26, to control the potential of anode 38 of the multigrid electron discharge device or pentode 40. Source 42 supplies anode 38 through the serially connected windings 44, 44', 44'' . . . 44$^n$ of the saturable reactors 46, 46', 46'' . . . 46$^n$ in variable filters $2p$, $3p$, $4p$ . . . $np$. These filters correspond to respective harmonic components of a fundamental component "$p$."

Incoming message waves are supplied over connecting circuit 20 through decoupling resistor 56, which is connected in series with the serially connected resonant circuits of the variable filters $2p$, $3p$, etc., and is preferably several times as large as the resistive component of any parallel resonant combination at its resonant frequency.

Variable filters $2p$, $3p$, $4p$ . . . $np$ are connected as a series termination for the incoming circuit 20. Each filter includes a resonant circuit composed of a capacitor 52, 52', 52'', etc., in parallel with an inductive element that includes the coil winding 48, 48', 48'', etc. Each filter is selective of an individual wave component of the incoming signal wave by virtue of the selective properties of its associated parallel resonant combination the frequency of resonance of which is continuously variable between values that correspond to the lowest and highest frequency values that may be assumed by an individual harmonic of the fundamental signal component. Thus, for example, if the fundamental component of the signal might be expected to vary between frequencies of 100 and 300 cycles per second, the parallel resonant circuit of filter $2p$ would be continuously variable from about 200 to 600 cycles per second. Filter $3p$ would be similarly arranged for the third harmonic component covering a range of about 300 to 900 cycles per second, and the other filters would be arranged in like manner.

Since filters $2p$, $3p$, etc. differ from each other only in the magnitudes of their circuit components, which differences are obvious departures required for the appropriate frequency ranges, the structure of these filters will be explained with reference to only the upper unit filter 2p.

Resonating winding 48 is wound on the core of reactor 46 along with biasing winding 44 and secondary winding 50. The core of reactor 46 is composed of any suitable metallic material, a number of which are known in the art, the permeability of which is variable in accordance with the flux density that exists in the material at a given instant. This flux density is controlled by the direct current flowing through biasing winding 44, which current is also the anode current of pentode 40. Secondary winding 50 together with resonating winding 48 form a transformer in which the potential across the open-circuited terminals reflects the current flowing in the primary, or resonating, winding 48 without extracting power from that circuit.

Through a suitable choice of core material, biasing winding 44 and other known related factors, the inductive reactance value of winding 48 may be caused to vary in inverse relation to the square of the current I flowing in control, or biasing, winding 44. Since the resonant frequency of such a parallel-connected circuit varies in accordance with the relation $$fr = \frac{1}{2\pi\sqrt{LC}}$$

and since the effective inductance of resonating winding 48 varies in accordance with the relation $$L = \frac{1}{I^2}$$

it is evident that the frequency of resonance of the parallel circuit varies linearly with the magnitude of the control, or anode, current flowing through winding 44. The proper choice of circuit constants permits this relationship to be observed in each variable filter over the desired frequency range.

Secondary winding 50 is included in the control grid-cathode circuit of an associated isolating electron discharge device or amplifying triode 54. The alternating component of the anode current of this triode is controlled by the induced voltage across the open-circuited terminals of winding 50. These components are rectified and filtered in individual rectifier and low-pass filter circuit 58. Rectifier and low-pass filter circuits 58, 58', 58'' ... 58ⁿ may take any conventional form and, for an assumed case where speech signals are to be applied to the system, the low-pass filter may have a cut-off frequency of about 25 cycles per second.

Bias battery 30 is chosen of equal value and opposite polarity to the unidirectional pitch-defining voltage that is received over circuit 26 from the pitch-defining circuit 22 when the fundamental component of the signal has its minimum value. In this manner, the resonant frequency of each of the variable filters 2p, 3p, etc., is maintained at a minimum value corresponding to the lowest frequency value of its respective harmonic component when the voltage received from the pitch-defining circuit 22 is equal to or less than a minimum value corresponding to the lowest fundamental component of the signal wave. During "unvoiced" periods of the signal, these variable filters will rest at their minimum resonating frequencies.

The arrangement of the variable speed enabler 62 and its associated variable speed sampler 60 is substantially identical at the transmitting and receiving stations. In the block schematic diagram of Figs. 1 and 2 the sampler unit 60 is functionally indicated as including a mechanical commutating device. This is symbolic of the electronic sampling means that are actually used for this purpose. The details of one sampling circuit are illustrated in Fig. 9. The details of the associated variable speed enabler 62 are illustrated in Fig. 7.

Referring to Fig. 7, it will be noted that variable speed enabler 62 comprises a relaxation oscillator branch 68, a synchronizing and reset pulse branch 70 and a pulser branch 72. The relaxation oscillator branch 68 receives, over connecting circuit 64, from pitch-defining circuit 22 a unidirectional voltage, the polarity of which is indicated on circuit 64, Fig. 7. Bias battery 90 is in the control grid-cathode circuit of electron discharge device or inverter tube 86, and regulates the potential of the latter's anode 95 when no current flows through potentiometer 94. Bias battery 88 is of such magnitude and polarity that it is equal and opposite to the pitch-defining voltage received over connecting circuit 64 when the signal wave has its minimum fundamental value.

The gas-filled discharge device or triode 74, capacitor 76, resistor 78 and potential source 80 comprise a conventional relaxation oscillator the frequency of oscillation of which is controlled by the magnitude of the potential on control grid 82. The potential of control grid 82 is controlled from two sources, one of which is the voltage drop across potentiometer 84 as controlled by the biasing battery 96 and the potential of anode 95. The other source is that of pulse potentials that may exist on connecting circuit 130 from the reset and synchronizing branch 70. Coupling capacitor 98 connects the relaxation oscillator to the control electrode of electron discharge device or triode 100, the anode 102 of which is coupled to control electrode 104 of electron discharge device or triode 106, which is arranged as a cathode follower stage with load resistor 108 in its cathode circuit. The cathode end of resistor 108 is connected to the cathode end of resistor 121 in the anode-cathode circuit of electron discharge device or triode 120, and the junction point of these two resistors is connected to the control electrode 110 of electron discharge device or triode 112. Triode 112 is also arranged as a cathode follower having load resistor 114 in its cathode circuit, which resistor is also included in the common cathode connection 116 of all of the lower electron discharge devices or triodes 134, 134', etc. in the pulser branch 72 of the enabler 62. Connecting circuit 116 includes a switch 152 which may be used for initially controlling current conduction in these triodes 134, etc.

Connecting circuit 66, from transmitting distributor 192 (Fig. 1) is connected to the control electrode of electron discharge device or triode 118 and to the control electrode of electron discharge device or triode 120. The cathode circuit of triode 118 contains a load resistor 119 shunted by a differentiating transformer 122. A unilaterally conducting device 124 is connected across the secondary side of transformer 122 in such manner that only a negative polarity pulse 125 is generated across the transformer secondary winding when a positive voltage synchronizing pulse is received on circuit 66. This negative pulse is supplied to the control electrode of electron discharge device or triode 128, and over connecting circuit 126 to the pulser branch 72.

The pulser branch 72 comprises a number of so-called trigger circuit units or stages of the well-known Eccles-Jordan type. These circuits are serially connected in a chain arrangement in such manner that as pulses are received over connecting circuit 116, succeeding ones of the trigger circuits are actuated to deliver a positive voltage enabling pulse on their output circuits 154, 154', etc. Each trigger unit involves on upper and lower electron discharge device or triode 132, 134 or 132', 134', etc. Since each unit is essentially the same as each other unit, only the first one involving triodes 132, 134 will be described. As in the usual trigger circuit unit, current conduction occurs in only one circuit branch at a time, and these units are arranged such that current initially flows in the upper triode 132 of each unit. Anode power is supplied from battery source 136 through anode resistors 138, 140. Resistors 142, 144 connect the anode of each triode to the control electrode of the other, and grid leak resistors 146, 148 connect to a suitable source of biasing battery. Pulse output circuit 154 is connected to the anode of the upper triode 132. The anode of lower triode 134 is connected to the control electrode of the next succeeding trigger unit through coupling capacitor 150. Capacitor 150 is selected of such value that, combined with anode resistor 140 and control grid resistor 148', it possesses a time constant which is substantially twice as long as the duration "t" of the short sharp negative pulse 99, which is transmitted from the anode of gas triode 74, through coupling capacitor 98 to triode 100. The opening of switch 152 in connecting circuit 116, opens the cathode circuit of all of the lower triodes 134, 134', 134'', etc., and forces conduction in the upper triodes 132, 132', 132'', etc.

As was previously stated, the arrangement of the variable speed sampler 60 is substantially identical at the transmitting and receiving stations. Each sampler 60 contains as many individual sampling, or gating circuits, the details of one of which are illustrated in Fig. 9, as there are variable filter circuit branches in the selection networks 28. The output pulses from the trigger circuit units of enabler 62 (Fig. 7) are supplied to respective ones of these sampling circuits over connecting circuits 154, 154', 154'', etc. Each connecting circuit 154, 154', 154'', is connected through a coupling capacitor 153 to winding 155 of pulse transformer 156 in a respective one of these Fig. 9 circuits. Transformer 156 includes three windings, 155, 157, 159, which are arranged in such manner that when a positive pulse is passed through the center winding 155, the control electrode end of each of the two outside windings 157 and 159 is made positive with respect to the cathode end. Two electron discharge devices or triodes 158, 160 are arranged in parallel, but with anode-cathode circuits conducting in opposite directions. Coupling capacitors 166, 168 connect the control electrodes of triodes 158, 160 to the respective transformer windings 157, 159. The addition of grid leak resistors 162, 164 converts each triode 158, 160 into a grid leak detector. Values for these components are chosen such that the control electrodes of the triodes are biased below cut-off, by grid rectification of the pulses from connecting circuit 154, during the period between pulses when no positive voltage impulse is actually being received from that circuit. When a positive voltage impulse from enabler 62 is transmitted through capacitor 153 and winding 155, the control electrode of each triode 158, 160 is momentarily driven strongly positive and each triode presents a low impedance conduction path between its input circuit 170 and its output circuit 172. At the transmitting end of the system, the input circuit 170 of each sampling circuit is connected to the output of a respective one of the variable filters 2p, 3p, etc., in the variable selection network 28. At the receiving end (Fig. 2), input circuit 170 of each sampling branch is connected in parallel to the output of low-pass filter 226 of receiving distributor 218 (Fig. 2). At the transmitting end, output circuit 172 of each sampling branch is connected in parallel to the control electrode 174 of electron discharge device or triode 176 of combining circuit 178. At the receiving end (Fig. 2), output circuit 172, 172', 172'', etc., of each sampling branch is connected to the input of a respective low-pass filter 230, 230', 230'', etc., where frequency components of the sampling frequency are eliminated.

At the transmitting end, combining circuit 178 (Fig. 1) comprises a triode 176 having a control grid electrode 174, a storage capacitor 180 connected in its control grid-cathode circuit and a cathode load resistor 182. Low-pass filter 184 is connected across load resistor 182. The cut-off frequency of filter 184 will be determined by the number of harmonic components that may exist in the original signal, the number of sampling cycles per second of sampler 60, and a desired quality of the reproduced signal. For an assumed case where the amplitude modulations of the signal wave may be expected to vary at a syllabic rate which will probably not exceed about eight changes per second, the pitch frequency may be expected to vary from about 100 to 300 cycles per second and the signal band width not exceed about 3,000 cycles per second, the cut-off frequency of filter 184 might well be at some value between 250 and 500 cycles per second, depending upon the desired quality of the reproduced signal.

Connecting circuit 190 connects the output of filter 184 to transmitting distributor 192. Distributor 192 may be any suitable electrical or mechanical commutator arrangement for distributing the signal derived from filter 184 to a number of relatively low speed outgoing channels. In Fig. 1 this arrangement is symbolically indicated as using a mechanical commutator 194. Circuit 190 is connected to wiper arm 198 of mechanical commutator 194, which has as many segments 196 as there are outgoing channels. Synchronizing arm 200 is mounted on the same shaft as, but is insulated from, wiper arm 198 and, on each rotation, contacts synchronizing segments 202, 203, the latter of which is supplied energy from positively poled battery 204. Connecting circuit 66 connects synchronizing segment 202 to the control electrodes of triodes 118 and 120 in the transmitting variable speed enabler 62 (Fig. 7), and delivers a synchronizing pulse to these triodes each time arm 200 bridges contacts 202, 203. Wiper arms 198, 200 of commutator 194 make one complete revolution during the time required for variable speed sampler 60 to sample the output of each variable filter of variable selection network 28. Where, as here, the cut-off frequency of each low-pass filter 58 in the transmitting variable selection network 28 is about 25 cycles per second, the time required for one revolution is about 1/50 of a second. This time interval is in accordance with well-known time-division multiplex practice, in accordance with which the sampling frequency of sampler 60 is preferably made equal to, or more than, twice the largest sampled frequency, or about 50 sampling cycles per second. This same time-division multiplex principle controls the sampling of the output of filter 184, and also the number of segments 196 that are required on commutator 194. Thus, if filter 184 has a cut-off frequency of about 250 cycles per second and commutator 194 makes a complete revolution in 1/50 of a second, there should be provided at least ten segments 196 and ten outgoing channels in order to secure 500 samples of the output of filter 184 each second. Each segment 196 is connected to a respective electron discharge device or triode 206, 206', etc., which here symbolically indicates any suitable frequency modulated oscillation source, the frequency of oscillation of which is variable in accordance with the potential stored on storage capacitor 208, 208', etc., in the control grid-cathode circuit of each oscillator. A cathode resistor 210, 210', 210'', etc., is included in the cathode circuit of each oscillator 206 to provide a proper impedance transformation between the oscillatory source and the respective outgoing channel.

At the receiving end (Fig. 2), receiving distributor 218 includes an electrical or mechanical commutator 222 which is substantially the counterpart of transmitting commutator 194. The output of frequency modulation detectors 220, 220', 220'', etc., are connected to the respective segments of commutator 222 which has a wiper arm 224, a synchronizing arm 223 and synchronizing segments 225, 227, the function of which is the same as that of the like items in the transmitting commutator. Connecting circuit 232 connects synchronizing segment 225 to the receiving variable speed enabler 62.

The details of variable speed sampler 60 and variable speed enabler 62 are the same as those explained in connection with the transmitting unit and as were discussed in detail in connection with Figs. 7 and 9.

The source of synthesizing energy 234 may be any conventional arrangement such, for example, as was disclosed in the previously mentioned Dudley patent in which a relaxation oscillator provided the "voiced" energy and a noise generator provided the "unvoiced" or "hiss" type of energy. Receiving variable selection network 28 comprises the same arrangement of variable filters 2p, 3p, 4p, etc., as was explained in connection with Fig. 6 in the transmitting apparatus. Modulator 238 includes a shaping network SN₂, SN₃, SN₄, etc., corresponding to each harmonic component. These shaping networks may be any conventional and convenient type of amplitude modulator, such as an amplifier, the gain of which is controlled by a unidirectional voltage received from a corresponding low-pass filter 230, 230', 230'', etc., associated with the receiving variable speed sampler 60. The outputs of the shaping networks SN₂, SN₃, etc., are combined in a single circuit 242 to constitute the synthesized signal output.

The manner in which the system of this invention operates may be best understood from a description of its analyzing and synthesizing functions when considered with general reference to the transmitting and receiving equipment arrangements indicated in Figs. 1 and 2, and with occasional specific references to the other figures of the drawing. For the purpose of this description, it will be assumed that the wave to be analyzed and synthesized is a speech signal wave comprising so-called "voiced" and "unvoiced" intervals. During the "voiced" interval, the signal energy is grouped in a number of wave components that are distributed in harmonic relation to a fundamental component that may or may not actually be present in the wave. During the "unvoiced" interval, the signal energy is distributed more or less continuously throughout the frequency spectrum of the signal band.

The pitch of such a signal is variable at a relatively low rate which does not ordinarily exceed about eight changes in a second, and which has generally been termed the syllabic rate. The amplitudes of the signal wave components are also variable, and may change at the same relatively low syllabic rate not to exceed about eight changes in a second. The range of the pitch, or fundamental frequency, of such a signal might well be from about 100 cycles per second to 300 cycles per second, and the maximum bandwidth of such a signal might be confined between fixed frequency limits, for example, 200 to 3200 cycles per second. From the foregoing, it is evident that the number of wave components that may be present in the signal wave at any instant is determined by the pitch, or frequency of the fundamental component. This condition is indicated in the idealized energy distribution representations of Figs. 3 and 4. In Fig. 3 there is indicated the distribution of signal energy across the frequency band for a low pitched voice. Fig. 4 indicates this distribution for a high pitched voice. The solid vertical lines in these figures represent the relative amplitudes of individual harmonic wave components of the fundamental frequency. The significance of the block areas that are defined by the solid and dotted lines of these figures will be explained later. A continuous curve connecting the top of each individual component would represent the amplitude characteristic of the signal's frequency spectrum at the given instant, and might be termed the signal's spectrum-amplitude curve. Such a curve is illustrated in Fig. 5. This curve 188 represents a voltage distribution which contains all of the essential information regarding the relative amplitudes of the wave's components, and it may be used to control the amplitudes of wave components from a separate source of energy to reconstruct, or synthesize, that portion of the original signal wave. The frequency, or spectrum location of these wave components is controlled by the pitch of the signal.

From the foregoing it is evident that as the number of harmonic wave components varies from instant to instant, the number of points on the continuous envelope, or spectrum-amplitude curve, which are representative of the amplitudes of the individual components, is similarly variable. If, then, the synthesized signal is to be a faithful reflection of the relative amplitude of each harmonic component in the original signal wave, a variable number of harmonic amplitude measurements must be made during succeeding intervals in analyzing the original signal wave.

Now, assume that a "voiced" signal wave is supplied over input circuit 20 from a source that is not shown. This wave is divided between the pitch-defining circuit 22 and the transmitting variable selection network 28. Pitch-defining circuit 22 produces a slowly fluctuating unidirectional voltage, the magnitude of which varies in direct linear relation to the frequency of the fundamental component, or pitch, of the signal. This voltage output appears on the three connecting circuits 24, 26 and 64, and is available for control uses which will be described.

The voltage on circuit 26 controls the frequency setting of each of the variable filters 2p, 3p, etc. in transmitting selection network 28. Refer now to Fig. 6, in which the details of these variable filters are illustrated. With no voltage on circuit 26, bias battery 32 maintains the anode current of pentode 40 at some minimum value, the magnitude of which is sufficient to cause each inductor 48, 48', 48'' ... 48n to resonate with its associated capacitor 52, 52' etc. at a frequency that is equal to the minimum value that its respective wave component may assume. Thus, for filter 3p in our assumed example, this minimum resonant value would be 300 cycles per second, and the effective inductance of inductor 48' would be regulated to a suitable value to resonate with capacitor 52' at this value. As the voltage on circuit 26, with polarity as indicated, exceeds a minimum value corresponding to 100 cycles per second, the current flow in potentiometer 36 causes a voltage drop, which when added to the potential of battery 32 increases the anode current of tube 40. This increased anode current increases the flux density in the core of each reactor 46, 46', etc., and reduces the effective inductance of each associated inductor 48, 48', 48'', etc., to a new value such that it and its associated capacitor 52, 52', 52'', etc., resonate at a frequency corresponding to the respective harmonic of the signal's instant fundamental frequency.

The resonating elements of each filter 2p, 3p, etc., are connected in series, and together with the coupling resistor 56 form a termination for the lower half of input circuit 20. Signal energy corresponding to the resonant frequency of the respective variable filter oscillates between the capacitive and inductive branches of each resonant network, and induces in the respective secondary winding, 50, 50', 50'', etc., a corresponding voltage which appears across the open terminals of that winding. These voltages regulate the respective control grid cathode potentials of the isolating triodes 54, 54', etc., and produce their replica in the respective anode circuit of the triode. The alternating components of these anode voltages are rectified and filtered in the usual manner in circuits 58, 58', 58'', etc. These actions produce on each connecting circuit 170, 170', 170'' ... 170n, slowly fluctuating unidirectional voltages, the amplitude of each of which is representative of the amount of signal energy that is segregated by the respective variable filter 2p, 3p, etc. The numbers, locations and amplitudes of these fluctuating voltages will vary as the frequencies and amplitudes of the harmonic wave components change in the signal wave.

These unidirectional voltages are supplied over connecting circuits 170, 170', etc., to the transmitting variable speed sampler 60 where each one is sampled 50 times a second. It will be recalled that the signal energy distribution during any instant reflects the number of harmonic components that are present at that instant, and also that the synthesized signal is to be composed of the proper number of harmonic components having correct relative amplitudes with the proper spacing between the harmonics. In order to meet these requirements, sampler 60 varies the interval between successive samples from one sampling cycle to another in such manner that during low pitch intervals of the signal it takes more samples during each cycle than are taken during intervals of higher pitch. Not only does it take more samples during the low pitched interval but the interval between successive samples is shorter than the intervals between successive samples during the high pitched signal interval. The time relationship between these samples closely approximates the relative frequency positions of the actual harmonic components during low and high pitch signal intervals.

Each connecting circuit 170, 170', 170'', etc., connects the relatively large capacitor (not shown) in the output of its low-pass filter 58, 58', 58'', etc., to the input of a respective individual gating, or sampling circuit, the details of which are illustrated in Fig. 9. Referring to that figure, when a positive voltage impulse is received over connecting pulse circuit 154, the anode-cathode paths of the oppositely conducting triodes 158 and 160 momentarily provide low impedance conduction paths between the input and output circuits 170, 172, respectively. Therefore, as each sampling circuit is momentarily made conductive, the charge that is stored in its associated low-pass filter circuit is quickly transferred to the relatively small control grid storage capacitor 180 in combining circuit 178 of Fig. 1. The gating, or sampling circuits contained in sampler 60 are sequentially operated, or made conductive by pulses received over the respective connecting circuit 154 from the respective trigger circuit units in the pulser branch 72 of variable speed enabler 62, and a new sampling cycle is started each 1/50 of a second. The timing of each sampling cycle as well as the regulation of the interval between successive sampling operations in the same cycle is controlled by the operation of the transmitting variable speed enabler 62, the details of which are illustrated in Fig. 7.

The manner in which the variable speed enabler 62 operates to successively activate the sampling, or gating circuits in sampler 60 may be best understood by reference to Fig. 7. Consider first the operation of this circuit as it regulates the interval between successive samples in any sampling cycle of transmitting variable speed sampler 60. Pitch-defining unidirectional voltage from pitch circuit 22 (Fig. 1) is received on connecting circuit 64, with the polarity as indicated. When no voltage, or when the minimum voltage, is received from pitch circuit 22, the variable relaxation oscillator branch 68 produces a maximum number of short, sharp, negative voltage impulses 99, each of duration "t." Under these circumstances sampler 60 takes a maximum number of samples during each sampling cycle. It might be well to note at this time that this condition only exists during "unvoiced" intervals of the signal, or during "voiced" signal intervals when the fundamental frequency is at its lowest limit. At such times, each variable filter 2p, 3p, etc., of transmitting selection network 28 is at its minimum frequency value, and energy is selected from the signal wave at a maximum number of frequencies. If the signal has its minimum fundamental frequency at this time, each filter will select the corresponding harmonic wave component. If the signal is in an "unvoiced" interval at this time, each filter selects a representative amount of energy at its resonant frequency. In either event, the spectrum-amplitude characteristic of the signal wave is determined at a maximum number of frequencies.

Returning to the oscillator branch 68 (Fig. 7), the frequency of recurrence of pulses 99 is controlled by the potential of control electrode 82 of gas-filled triode 74. This potential is in turn controlled by the combination of the potentials of anode 95 of triode 86 and bias battery 96. When no voltage is being received from circuit 64, anode 95 and control electrode 82 are at their maximum potentials. When there is present on circuit 64 a pitch-defining voltage that exceeds the potential of bias battery 88, current flows through rectifier 92 and potentiometer 94 to produce a positive grid bias that causes the potential of anode 95 to be lowered. This decrease lowers the potential of control electrode 82, thereby reducing the "firing" frequency of triode 74, and the frequency of recurrence of negative pulses 99.

Pulses 99 from gas triode 74 in oscillator branch 68 are inverted in triode 100, and are coupled through cathode follower 106 to the control electrode 110 of cathode follower 112. Resistor 114 is included in the common cathode circuit 116 of lower triodes 134, 134', etc., of the trigger circuit units of pulser branch 72. Each time that a positive voltage impulse appears across resistor 114, these cathodes of the lower triodes 134, 134', etc., are made sufficiently positive with respect to their control grids to stop conduction in any of the lower tubes. This pulser branch 72 is arranged such that all of the upper triodes 132, 132', etc., are initially conductive, and therefore, until conduction is started in a lower triode 134 these cathode control pulses are ineffective. The manner in which conduction is changed from upper triode 132 to lower triode 134 will shortly be described in connection with the discussion of the manner in which enabler 62 controls the timing of each cycle of variable speed sampler 60. Assume for the moment that in some manner triode 132 is made non-conductive and triode 134 is made conductive. The anode voltage of triode 132 rises sharply and a short positive voltage pulse is transmitted over conductor 154 to the sampling circuit branch (Fig. 9) of transmitting variable speed sampler 60 that is associated with variable filter 2p, in transmitting variable selection network 28. During the short interval of this pulse the sampling circuit (Fig. 9) provides a low impedance path between variable filter 2p and combining circuit 178 in the manner that has been described.

When the next pulse 99 is received from gas triode 74, the cathode of triode 134 is momentarily elevated to a point where conduction is stopped in this tube, and is started in upper triode 132. The anode potential of triode 134 rises sharply and a positive voltage pulse is transmitted through coupling capacitor 150 to start conduction in, or to trigger, triode 134'. This action stops conduction in triode 132' and produces on its connecting circuit 154' a positive voltage impulse which actuates the sampling circuit branch (Fig. 9) of variable speed sampler 60 (Fig. 1) that is associated with variable filter 3p in transmitting variable selection network 28. In this manner, as successive impulses 99 are received from the relaxation oscillator branch 68 of enabler 62 (Fig. 7), the successive stages of pulser branch 72 are actuated, and the sampling circuit branches of sampler 60 (Fig. 1) are successively actuated to connect their respective filter branch of variable selection network 28 to the combining circuit 178. This successive stepping action of pulser branch 72 will continue until the last trigger circuit stage "n" is operated, or until current conduction is simultaneously stopped in all of the lower triodes 134, 134', etc., and is restored in all of the upper triodes 132, 132' to reset the pulser branch 72 for a new sampling cycle. The manner in which this is accomplished will now be explained.

The fixed duration sampling cycles of sampler 60 are timed by synchronizing impulses received over connecting circuit 66. In this described embodiment these impulses are received from transmitting distributor 192 (Fig. 1), though this is not a necessary condition for the successful practice of this invention, since these pulses might be obtained from any suitable periodic element that may be operated in synchronism with a similar element at the synthesizing location. The impulse, which arises when synchronizing arm 200 of commutator 194 bridges segments 202 and 203, is substantially square-topped, and is preferably of duration about four times that of time "t" of pulses 99. The pulse is simultaneously supplied to the control electrodes of triodes 118 and 120 (Fig. 7) to produce duplicate voltage pulses across cathode resistors 119, 121 and 114. The pulse produced across resistor 114 elevates the cathodes of the lower triodes 134, 134', etc., and stops conduction therein in the previously described manner. The duration of this pulse is long, as compared to the time constant of the coupling capacitors 150, 150', etc., and their associated resistors, and any residual charge on these capacitors is dissipated during the pulse duration. In this manner, the upper triodes 132, 132', etc., of pulser branch 72 are restored to their initial current conduction state, and the pulser branch 72 is reset for a new sampling cycle.

During this same time, a duplicate pulse is produced across the cathode resistor 119 of triode 118, which pulse is differentiated in transformer 122. The positive voltage impulse product of this differentiation is clipped by rectifier 124 in such fashion that a single, sharp, negative voltage impulse, as indicated by wave form 125, ensues; this pulse is used to start each sampling cycle, and also to reset the relaxation oscillator branch 68 in such manner that it starts a new timing interval at the start of each new sampling cycle.

The cycle-starting function of this negative voltage impulse 125 is accomplished when one portion of it is transmitted through coupling capacitor 143 to the control grid of upper triode 132 in pulser branch 72, to cause this tube to cease conduction. As was previously explained, this causes a potential rise at the anode of this tube, which rise is used to actuate the sampling circuit associated with the first variable filter 2p in variable selection network 28. It also causes the lower triode 134 to start conduction, and readies the chain of trigger circuit units for sequential operation by subsequent pulses received from the gas triode 74 in the oscillator branch 68 of the circuit.

Figure 8A:
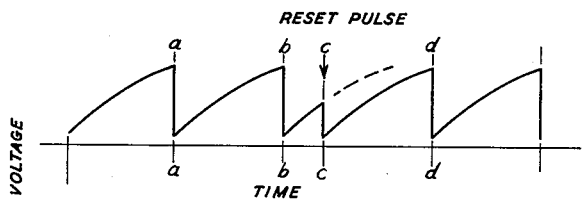
Figure 8B:
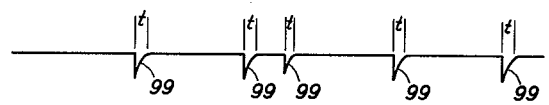

The second portion of this negative pulse 125 is inverted in triode 128, and is supplied over connecting circuit 130 to actuate gas triode 74 and reset the charging cycle of capacitor 76 coincident with the start of the new sampling cycle. This action is indicated by the wave forms of Figs. 8A and 8B. Fig. 8A illustrates the build-up and decay of the voltage across capacitor 76. During the interval "a—b" this voltage increases at an exponential rate that is determined by the values of capacitor 76, resistor 78 and battery 80. Triode 74 "fires" at time "b" at a voltage value that is determined by the potential of its control electrode 82, which value is related to the signal's pitch, or frequency of its fundamental component, and the charging operation is restarted. At time "c," coincident with the formation of negative voltage impulse 125 and the start of a new sampling cycle, the positive voltage pulse that is supplied over connecting circuit 130 (Fig. 7) from triode 123 to the control grid 82 of gas triode 74 causes this latter tube to "fire," and starts capacitor 76 on a new charging cycle. This new charging cycle is indicated by the interval "c—d" at the start of the new sampling cycle. Coincident with these times "a," "b," "c" and "d," short, sharp, negative voltage impulses 99 (Fig. 8B) are delivered through coupling capacitor 98 to actuate the pulser circuit 72, and advance the sampling operation in the manner that has been described.

In this manner the enabling impulses on the connecting circuits 154, 154', etc., are advanced from one sampling, or gate circuit to another in the sampler 60, as subsequent pulses 99 are received from the oscillator branch 68 of the variable speed enabler 62. This process continues until, at the next succeeding time "c," the synchronizing pulse from transmitting distributor 192 restarts the sampling cycle, and resets the operation of the oscillator circuit branch 68, in the manner that has been described. If during this next sampling interval, the fundamental frequency of the signal wave has changed from its prior value, the voltage on connecting circuit 64 will be changed and the relaxation oscillator circuit branch 68 will accordingly change its pulse repetition rate. Pulser circuit 72 will deliver enabling impulses over its connecting circuits 154, 154', etc., at a revised rate, and sampler 60 will sample a different total number of variable filter branches in variable selection network 28 during the next succeeding sampling cycle.

As the sampling operation proceeds, a low impedance path is momentarily provided between the output capacitor (not shown) of each variable filter 2p, 3p, etc., in the selection network 28 and the storage capacitor 180 in combining circuit 178 (Fig. 1). Since capacitor 180 is small relative to these filter capacitors, any potential difference between the two is quickly equalized, and capacitor 180 quickly assumes a charge which is substantially equal to the original charge on the filter capacitor. When the effect of the enabling pulse is removed, this charge is isolated on capacitor 180 in the grid circuit of triode 176, since the control electrode 174 never becomes positive with respect to its cathode, and the return path through triode 158 (Fig. 9) to the filter capacitor is opened; and there is produced across cathode resistor 182 a potential that remains substantially constant until the next succeeding variable filter in selection network 28 is sampled and a new charge is established on capacitor 180. Thus there appears across resistor 182 a continuous series of voltage impulses such as are indicated by the rectangular block areas that are defined by the solid and dotted lines of Figs. 3 and 4. These areas in Fig. 3 show this condition for a low pitched signal, and the areas of Fig. 4 show the same for a high pitched signal. This fluctuating potential is smoothed in filter 184 to produce a continuous spectrum-amplitude voltage which is similar to the original spectrum-amplitude curve 188 of Fig 5, and in which the amplitude at any instant is representative of the amplitude of the harmonic component that is being sampled at that instant. This smoothed voltage curve at the output of filter 184 is a continuously variable function which may undergo a complete transformation fifty times each second, if the frequencies and/or the relative amplitudes of the components in the signal wave change with that rapidity.

This variable amplitude unidirectional wave, when used in combination with the pitch-defining voltage on interconnecting circuit 24, may be used to directly control the operation of the synthesizing apparatus. However, in an embodiment such as is being described, it is usually desirable to transmit these control voltages a considerable distance. This transmission may be accomplished by an inverse time division multiplex arrangement whereby the spectrum-amplitude voltage wave may be distributed to a plurality of low speed, or narrow bandwidth, outgoing channels in each of which the duration of the distributed signal may be considerably increased over its instantaneous value. The combined spectrum-amplitude wave is transmitted over interconnecting circuit 190 to transmitting distributor 192. As wiper arm 200 bridges the synchronizing contacts 202, 203, the previously mentioned positive voltage synchronizing impulse is transmitted from battery 204 over interconnecting circuit 66 to the variable speed enabler 62 where it starts a new sampling cycle, and resets the phase of oscillation in the relaxation oscillator circuit branch 68 in the previously described manner. Wiper arm 198 contacts each commutator segment 196, and stores on its associated grid capacitor 208, 208', 208'', etc., a potential corresponding to the instantaneous voltage value of the spectrum-amplitude curve as it appears at the output of filter 184. Each frequency modulated oscillator 206, 206', etc., then transmits a distinctive frequency that is individual to the potential stored on its grid capacitor 208, 208', etc., until a different potential is stored on this capacitor during the next rotation of arm 198. These frequency modulated oscillatory waves are transmitted to the receiving, or synthesizing station (Fig. 2) where they are received, demodulated and used to control the operation of the synthesizing apparatus in a manner which will now be described.

Referring to Fig. 2, the incoming frequency modulated waves are received by receiving distributor 218 where they are demodulated in frequency modulation detectors 220, 220', 220'', etc., and the resulting unidirectional voltages are applied to the commutator segments of the receiving commutator, which is again symbolically indicated by a mechanical commutator 222. Transmitting and receiving distributors 192, 218 may be synchronized in any suitable manner in which several are well known in the telegraph art. Wiper arm 223, in conjunction with synchronizing segments 225, 227 and the associated battery, produces on interconnecting circuit 232 a positive voltage impulse in the same manner and at the same relative time as its counterpart is produced at the transmitting station. This impulse is used to start each sampling cycle of the receiving variable speed sampler 60, and to reset the phase of the relaxation oscillator circuit branch 68 in the receiving variable speed enabler 62 in the same manner as these operations were performed in transmitting end counterparts of these circuits.

In describing the operation of this receiving apparatus, the same reference numerals are used to indicate circuit components as were used at the transmitting station, where the circuit components are identical in nature.

The time-divided spectrum-amplitude wave is reassembled by the action of commutator 222 and low-pass filter 226. At the output of low-pass filter 226, this voltage curve has substantially its original form which is also substantially the same as the original spectrum-amplitude curve as indicated by curve 188 of Fig. 5. This voltage is supplied over circuit 170 to the receiving variable speed sampler 60 which, as in the case of the transmitting apparatus, comprises a set of circuits in accordance with Fig. 9 for each harmonic component that may be expected in the original signal wave. In other words, there are as many receiving sampling circuits in accordance with Fig. 9 as there are variable filter circuits 2p, 3p, etc., at the transmitting, or at the receiving end. Each sampling circuit is sequentially operated by an enabling voltage pulse derived over interconnecting circuits 154, 154', 154'', etc., from the receiving variable speed enabler 62. This enabler 62 is substantially identical to the transmitting variable speed enabler 62, and always operates at the speed, or frequency of that enabler, since its frequency of operation is controlled by the pitch-defining voltage received over interconnecting circuits 24, 64 from the transmitting end pitch-defining circuit 22. In this manner, each sampling branch circuit of receiving sampler 60 samples the reconstructed spectrum-amplitude voltage at a time when its amplitude is indicative of the amplitude of a designated harmonic component in the original signal wave. These sampled voltages are applied to the modulator 238, where each individual sampling branch circuit is associated with an individual shaping network SN$_2$, SN$_3$, SN$_4$, etc.

The source of synthesizing energy 234 comprises a source of "buzz," or voiced energy, and a source of "hiss," or unvoiced energy. The fundamental frequency of the voiced energy is controlled by the amplitude of the pitch-defining voltage on circuit 24, and thus is substantially the same as the signal's fundamental frequency. This energy is supplied over connecting circuit 226 to the receiving variable selection network 28, the character and the control of which by the pitch-defining voltage obtained over connecting circuits 24, 26 are identical with the character and operation of the like apparatus described at the transmitting end, and the details of which are illustrated in Fig. 6. Variable filters 2p, 3p, 4p, each have resonant frequencies which correspond to adjacently-related harmonic components of the fundamental frequency of the "buzz" or voiced energy received from source 234. These filters operate to segregate the energy from source 234 into individual harmonically-related frequency components which are then supplied over connecting circuits 240, 240', etc., to each of the shaping networks SN$_2$, SN$_3$, SN$_4$, etc. where they are combined with the individual amplitude control voltages that are segregated by the sampling branch circuits of the receiving variable speed sampler 60. The amplitude of the harmonic component is modulated in each shaping network in accordance with the amplitude of the segregated control voltage, and in this way is made to simulate the amplitude of the harmonic component of the same frequency in the original signal wave. The outputs of the shaping networks are combined in the signal output circuit 242 to constitute the reconstructed, or synthesized signal.

In this preceding explanation it has been assumed that the signal wave comprised only voiced energy, because in this type of signal both the amplitudes and the frequencies of the harmonic components are variable. During those intervals when the signal wave comprises only unvoiced energy, the pitch-defining circuit 22 produces no output voltage, and the variable filters 2p, 3p, 4p, etc., in the transmitting and receiving variable selection networks 28 are adjusted to correspond to the lowest frequency that their respective harmonic component may assume. Under these conditions each transmitting variable filter 2p, 3p, etc., selects a portion of the unvoiced signal energy, and there is produced a spectrum-amplitude voltage wave which is composed of the maximum number of energy samples. This is desirable since, in the unvoiced type of signal, the energy is distributed in a continuous fashion throughout the signal spectrum instead of in harmonic groupings as in the case of the voiced signal. This spectrum-amplitude wave is transmitted to the receiving, or synthesizing end of the system, in the previously described manner, and produces at the output of the receiving variable speed sampler 60, a series of control voltages the amplitude of each of which is indicative of the energy in the respective portion of the signal at the given instant. At the same time the variable filters 2p, 3p, etc., of receiving variable selection network 28 are adjusted to harmonic frequencies of the same minimum fundamental frequency, and similarly select the maximum of samples of unvoiced, or "his" energy from the source of synthesizing energy 234. This selected noise energy is supplied to the individual shaping networks SN$_2$, SN$_3$, SN$_4$, etc., where it is modulated in accordance with the amplitude of the associated control voltage in the previously described manner to produce the synthesized unvoiced signal in output circuit 242.

Figure 10A:
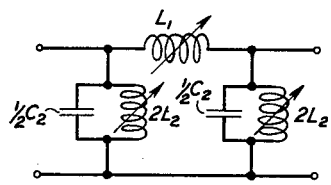
Figs. 10A, 10B and 11 are schematic diagrams of band-pass filter structures which may be adapted as the variable selective means as alternative arrangements for the variable frequency selective means illustrated in Fig. 6.
Figure 10B:
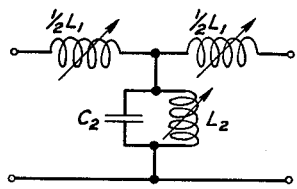
Figure 11:
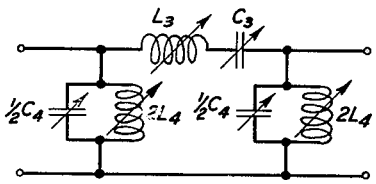

In the system that has been described, the variable frequency filters 2p, 3p, 4p, etc., of the transmitting and receiving variable selection networks 28 comprise a series array of parallel resonant circuits, each of which selects a harmonic component the frequency of which corresponds to its resonant frequency. In Figs. 10a, 10b, and 11, there are shown variable filter network structures which may be employed in place of the serially-connected parallel resonant structures illustrated in Fig. 6.

Fig. 10a shows the conventional mid-shunt band-pass filter, and Fig. 10b shows the equivalent mid-series band-pass filter structure in which the series and shunt inductive members are made variable. These inductive members may comprise saturable core reactors such as were used in the variable filters described in connection with Fig. 6. If the value of the series inductive member L$_1$ is varied substantially inversely as the lower frequency limit of the pass band is to be varied, and if the shunt inductances L$_2$ are varied substantially inversely as the square of the lower frequency limit of the pass band, the characteristic impedances and the pass bands of the filters remain substantially constant, but the frequency location of the pass bands is varied in accordance with the changes in the inductive members of the filter.

Referring to the filter structure of Fig. 11, it will be noted that all four reactance elements are made variable. Inductor $L_3$ and capacitor $C_3$ form the series branch impedance elements, and inductors $L_4$ and capacitor $C_4$ form the shunt branch impedance elements. Variable capacitances for this purpose may be obtained from conventional reactance tube circuits, or from ceramic condensers of the titanate class, the alternating-current capacitance of which may be varied by a superposed direct voltage, as is described in the copending application of A. M. Curtis, Serial No. 704,151, filed October 14, 1946. In this structure, when all four reactance elements are simultaneously varied, the geometric mean between the upper and lower frequency limits of the pass band varies in inverse relationship to the changes in the reactance elements. From this it follows that the bandwidth of this filter is not constant but is proportional to the frequency location of its pass band. In some embodiments of the invention this may be a useful characteristic to employ since the spacing between adjacent harmonics is proportional to the frequency of the fundamental component of the wave, and hence is proportional to the frequency location of each specific order of the harmonic components.

Although in the foregoing description, the invention has been described with particular emphasis upon its incorporation in a vocoder type of transmission system wherein speech signals are transmitted with reduced frequency range, and in which specific circuits parameters are recited, it should be realized that its scope is not limited to such an arrangement. It is evident that the invention has many applications in the field of wave analysis in cases where it may be desired to obtain a rapid, continuous and accurate indication of the magnitudes of the various harmonic components of a wave of variable fundamental frequency. Other desirable aspects of the invention will undoubtedly occur to those skilled in the art, and suggest embodiments thereof which do not depart from the spirit and the scope of this invention.

What is claimed is:

1. A system for communicating a message that is represented by a frequency band of waves, which system comprises a source of waves having a discrete energy spectrum, said source including means for segregating said energy into a plurality of harmonically related wave components corresponding in frequency but dependent in amplitude relative to the harmonic overtones of the first-mentioned wave, analyzing circuits the attenuation frequency characteristics of which are variable in accordance with the fundamental frequency of said message wave for determining the syllabic time rate of change of energy in each significant harmonically related component of said message wave, and means controlled by the products of said determination for imparting substantially the same syllabic time rate of change of energy to corresponding harmonically related wave components from said source.

2. The method of operating on a variable frequency complex signal wave that is representative of a message signal, which comprises dividing said wave into a first and a second portion, determining the fundamental frequency of said first wave portion, individually segregating from said second portion a plurality of harmonically related wave components, and varying the number of said individually segregated components in accordance with changes in said fundamental frequency determination.

3. The method of operating on a variable frequency complex signal wave that is representative of a message signal, which comprises dividing said wave into a first and a second portion, determining the fundamental frequency of said first wave portion, individually segregating from said second portion a plurality of harmonically related wave components, and varying the number of said individually segregated wave components in inverse relation to changes in said fundamental frequency determination.

4. The method of operating on a signal wave that is represented by a quasi-periodic complex wave the frequency of which varies at a syllabic rate, which comprises dividing said wave into two portions, deriving from said first portion a representation of the fundamental frequency of said wave, continuously selectively segregating from the second portion individual wave components representative of each individual significant harmonic overtone of said fundamental frequency, varying the number of said individually segregated wave components in accordance with changes in the derived fundamental frequency representation, repetitively deriving an indication of the magnitude of each of said individually segregated wave components during uniformly recurring time intervals, and combining said magnitude indications into a single variable representation the magnitude of which is at any instant representative of the magnitude of an individual one of the harmonically related wave components in said quasi-periodic complex signal wave during a designated interval.

5. The method of operating on a variable frequency complex signal wave the frequency of which varies at a syllabic rate which comprises, dividing said wave into a first and second portion, analyzing said first wave portion to determine the fundamental frequency of said wave, individually segregating each from the other each harmonically related wave component in said second wave portion, repetitively deriving at least twice during each syllabic interval an indication of the magnitude of each of said individually segregated harmonically related wave components and combining said magnitude indications into a single representation the variable magnitude of which is at any instant representative of the magnitude of an individual one of the harmonically related wave components in said complex signal wave during a designated interval.

6. A signal analyzing and synthesizing system which comprises a plurality of wave segregating means each of which is responsive to an individual one of harmonically related wave components that represent a signal wave, a plurality of analyzers for separately determining the syllabic time rate of change of energy in each of said segregated components, a source of complex waves having its fundamental frequency equal to that of said signal wave and having the relative amplitudes of its components independent of the relative amplitudes of the components of said signal wave, a plurality of selective circuits corresponding to said analyzers which are variable in accordance with frequency changes in said signal wave for selecting individual harmonically related components of said complex wave, a plurality of modulators individually responsive to the time rate of change of energy determinations received from respective ones of said selective circuits for controlling the rate of change of energy in the individually segregated components of said complex wave, and means for combining said modulated components.

7. A system for analyzing a variable frequency complex signal wave which comprises, means for deriving from a first portion of said wave an indication of the fundamental frequency of said wave, a plurality of frequency sensitive networks including reactances for individually segregating from a second portion of said wave each harmonic component contained therein, means for varying the reactive values of said network elements in accordance with changes in said derived fundamental frequency indication, and means for deriving an indication respective each wave component of the energy content thereof.

8. A system for analyzing a variable frequency complex signal wave which comprises, means for deriving from a first portion of said wave an indication of its fundamental frequency, means for individually segregating from a second portion of said wave each individual harmonic component contained therein, said means comprising a plurality of variable frequency-sensitive networks including reactances, means for varying the reactive values of said network elements in accordance with changes in said derived indication, means for deriving an indication respective each segregated wave component of the energy content thereof, and means for combining said respective energy indications into a single indication the characteristics of which vary from instant to instant in accordance with the energy contents of the segregated components.

9. A system for analyzing a variable frequency complex signal wave which comprises means for deriving from said wave an indication of its fundamental frequency, selective means responsive to said derived indication for segregating into individual channels each significant harmonically related component in said signal wave, said selective means including a plurality of reactive impedance elements the reactances of which are responsive to changes in said derived frequency indication, means for sampling the energy content of each segregated component during recurring uniform intervals, and means for combining said samples into a single variable representation the amplitude of which at any designated interval is indicative of the energy content of a segregated component.

10. A system for analyzing a complex signal wave the frequency of which is variable at a syllabic rate which comprises, means for deriving from said wave an indication of its fundamental frequency, segregating means responsive to said derived indication for segregating into individual channels each significant harmonically related component in said signal wave, said segregating means including a plurality of impedance elements having reactances which are responsive to changes in said derived frequency indication, means for sampling for a predetermined minimum period the energy content of each segregated wave component during each syllabic interval, means responsive to said derived frequency indication for varying the sampling rate in accordance with changes in said indication, and means for combining said samples into a single variable representation the amplitude of which at any designated instant is indicative of the energy content in a respective one of said individual channels during said sampling interval.

11. A system for analyzing a complex signal wave, the frequency of which is variable at a syllabic rate which comprises, means for deriving from said wave an indication of its fundamental frequency, segregating means responsive to said derived indication for segregating into individual channels each significant harmonically related component in said signal wave, said segregating means including a plurality of impedance elements having reactances which are responsive to changes in said derived frequency indication, means for sampling for a predetermined minimum interval the energy content of each of said segregated harmonically related wave components, means responsive to said derived frequency indication for controlling the sampling rate during each of said sampling periods, means for repeating said sampling operation during recurring equal time intervals, and means for combining said samples into a single variable representation the amplitude of which at any designated interval is indicative of the energy content in a respective one of said harmonically related wave components.

12. In a system for analyzing a complex signal wave the frequency of which is substantially constant for short intervals of variable duration, means for deriving from said wave an indication of its fundamental frequency during each interval, segregating means responsive to said derived indication for segregating into individual channels each significant harmonically related wave component in said wave, said segregating means including a plurality of impedance elements having reactances which are variable in accordance with variations in the magnitude of said derived frequency indication, means for recurringly sampling each segregated wave component during a predetermined time interval, means for controlling the interval between samplings of adjacent components in accordance with the number of wave components to be sampled during each of said intervals, and means for combining said samples into a single indication the magnitude of which is indicative of the energy content in a respective one of said harmonically related wave components at a designated instant.

13. In combination, a source of variable frequency complex wave energy comprising fundamental and harmonically related wave components, means for controlling the fundamental frequency of said complex wave to produce a wave which varies in accordance with the frequency of the fundamental component of an original signal wave, means for segregating each harmonic wave component of said produced wave, said means comprising a plurality of variable frequency-selective networks each comprising an impedance element having reactance which is variable in accordance with changes in the frequency of the fundamental component of the original signal wave, means for modulating the relative amplitude of each segreated component in accordance with the relative amplitude relations existing between the harmonic components of the original signal wave, and means for combining said modulated harmonic components into a similitude of said original signal wave.

14. In a combination for analyzing and synthesizing a complex electric wave which comprises a plurality of wave components that are in harmonic relationship to a fundamental component, which comprises means for subdividing said wave into two portions, means for deriving from a first portion an indication of the frequency of the wave's fundamental component, variable frequency segregating circuits for dividing the second portion of said wave into its individual harmonically related components, said circuits including a frequency selective network respective each harmonic component that may exist in the original signal wave, each of said networks including a variable impedance element having reactance which is responsive to a characteristic of the derived fundamental frequency indication, means for determining during recurring sampling periods the energy level of each of the segregated wave components, means for limiting said energy determinations during each sampling period to the harmonic components that exist in said signal wave during said period, means for combining said intermittent samples into a continuous spectrum-amplitude representation of said original signal wave and in which the amplitude at any instant is indicative of a respective energy level of a harmonic component at a corresponding instant, means for transmitting said spectrum-amplitude representation to the synthesizing location, a source of synthesizing signal energy having fundamental and harmonically related components, and in which the frequency of the fundamental component is maintained in substantial agreement with the frequency of the fundamental component in said original signal wave, means responsive to said derived fundamental frequency indication for individually segregating each harmonic component of said synthesizing energy, said means including a frequency selecting network respective each harmonic component that may exist in the original signal wave, each of said networks including an impedance element having reactance which is controlled by the characteristic of the derived fundamental frequency indication, means for modulating the amplitude of each of said segregated synthesizing harmonic components in accordance with respective instantaneous values of said spectrum-amplitude representation, and means for combining said modulated components into a similitude of said original wave.

15. In a combination for analyzing and synthesizing a complex electric wave which comprises a plurality of wave components in integral harmonic relation to a fundamental wave component, means for subdividing said wave into two portions, means for deriving from a first portion an indication of the frequency of the wave's fundamental component, variable frequency segregating circuits for dividing the second portion of said wave into its individual harmonically related components, said circuits including a frequency selective network respective each harmonic component that may exist in the original signal wave, each of said networks including a variable impedance element having reactance which is controlled by the magnitude of the derived fundamental frequency indication, means for determining during recurring sampling periods the energy level of each segregated wave component during that period, means for limiting the number of samples taken during each sampling period in inverse relation to changes in said derived frequency indication, means for combining said intermittent samples into a continuous spectrum-amplitude representation the amplitude of which at any instant is indicative of the energy level of a respective harmonic component at a corresponding instant, means for transmitting said spectrum-amplitude representation to the synthesizing location, a source of synthesizing energy having a fundamental and its harmonically related wave components, and in which the frequency of the fundamental component is maintained in substantial agreement with the frequency of the fundamental component in said original wave, means responsive to said derived fundamental frequency indication for segregating the individual harmonic components of said synthesizing energy, said means including a frequency selective network respective each harmonic component that may exist in said original signal wave, each of said networks including an impedance element having reactance which is controlled by the magnitude of the derived fundamental frequency indication, modulatory means responsive to the respective amplitude values of said spectrum-amplitude representation for controlling the relative amplitudes of said synthesizing harmonic component, means for combining said modulated components, and means responsive to said derived fundamental frequency indication for controlling the number of modulated components that are so combined.

16. In a signal wave analyzing and synthesizing system, a means for sampling the amplitudes of the individual harmonic components of the signal wave which means comprises a normally unoperated sampling means, a pulse-producing means, means for deriving an indication of the fundamental frequency of the signal wave, oscillating means responsive to said frequency indication for actuating said pulse-producing means at a rate controlled by said frequency indication, and interconnecting circuit means for supplying said pulses to said sampling means for rendering said sampling means operative during said pulse periods.

17. In a signal wave analyzing system, a means for individually sampling the amplitude of each harmonically related wave component that may exist in a signal wave during each interval of a series of consecutive equal intervals which comprises, a pulse actuated sampling means, a sampler-actuating pulse-producing means, means for deriving an indication of the fundamental pitch of the signal wave, and oscillatory means responsive to said pitch indication deriving means for actuating said pulse-producing means and said sampling means at a rate inversely proportional to the fundamental pitch of the signal wave.

18. In the method of analyzing and synthesizing signal waves the character of which varies from one syllabic interval to another, the steps of successively sampling during each syllabic interval and in the order of their frequency positions the amplitude of each harmonic wave component existing in said signal wave during said interval, and the step of controlling the time interval between samples of adjacent wave components in accordance with the number of harmonic wave components existing in said signal wave during said syllabic interval.

19. In a signal wave analyzing system, a means for sampling the amplitude of each harmonically related wave component that exists in a signal wave during each interval of a succession of equal intervals which comprises, a pulse-operated sampling device respective each harmonically-related wave component that may exist in a given signal wave, means for deriving a voltage indication of the frequency of the fundamental component of the signal wave, oscillatory pulse-producing means responsive to said frequency indicating means for producing sampler-actuating pulses the repetition rate of which is inversely proportional to said derived frequency indication, a periodic pulse producing means having a repetition rate equivalent to said equal intervals, and distributing means responsive to said sampler-actuating pulse-producing means and to said periodic pulse-producing means for supplying said sampler-actuating pulses during each equal interval to respective ones of said sampling devices in the order of the relative frequency relations of the harmonic components respective said sampling devices.

20. The method of operating on a variable frequency signal wave the amplitudes of the wave components of which are variable at a predetermined maximum rate, which method comprises segregating the components of said wave in accordance with the frequency of said wave, sampling the energy in each segregated portion at a fixed rate proportional to the maximum rate of said amplitude changes, varying the interval between samplings of adjacently frequency-located segregated portions in accordance with changes in the frequency of said wave, and combining said energy samplings in the order of their extractions into a single variable function that is representative of the relative amplitudes of the components of said signal wave.

21. The method of operating on a variable frequency signal wave, the amplitudes of the harmonically-related wave components of which are variable at a predetermined rate, which method comprises segregating the individual harmonically-related components of said wave, extracting a specimen of the energy content of each of said segregated components at a fixed rate which is proportional to the maximum rate of said amplitude changes, varying the interval between energy-specimen extractions from adjacent components in accordance with changes in the frequency of said wave, and combining said extracted energy specimens in the order of their extraction to form a single variable voltage representation of the relative amplitudes of said segregated components.

ROBERT C. MATHES.

References Cited in the file of this patent

UNITED STATES PATENTS

| Number | Name | Date |
|---|---|---|
| 2,098,956 | Dudley | Nov. 16, 1937 |
| 2,183,248 | Riesz | Dec. 12, 1939 |
| 2,243,089 | Dudley | May 27, 1941 |
| 2,269,295 | Vaderson | Jan. 6, 1942 |
| 2,286,072 | Dudley | June 9, 1942 |
| 2,339,465 | Dudley | Jan. 18, 1944 |

FOREIGN PATENTS

| Number | Country | Date |
|---|---|---|
| 543,238 | Great Britain | Feb. 16, 1942 |